(12) United States Patent
Wangner et al.

(10) Patent No.: US 6,953,565 B2
(45) Date of Patent: Oct. 11, 2005

(54) PROCESS FOR PRODUCING AMMONIUM POLYTHIMOLYBDATE

(75) Inventors: Ronald P. Wangner, Garden City, NY (US); Joby V. John, Prospect Park, NJ (US); Gregory C. Giffin, Martinsville, NJ (US)

(73) Assignee: Infineum International Limited (GB)

( * ) Notice: Subject to any disclaimer, the term of this patent is extended or adjusted under 35 U.S.C. 154(b) by 0 days.

(21) Appl. No.: 10/693,476

(22) Filed: Oct. 24, 2003

(65) Prior Publication Data

US 2005/0089462 A1 Apr. 28, 2005

(51) Int. Cl.$^7$ .......................... C01B 17/00; C01B 17/98; C01B 21/00; C01G 39/00
(52) U.S. Cl. ...................................... 423/511; 423/517
(58) Field of Search ................................. 423/517, 511

(56) References Cited

U.S. PATENT DOCUMENTS

| | | | | |
|---|---|---|---|---|
| 2,556,255 A | * | 6/1951 | Carosella ...................... | 423/58 |
| 2,892,741 A | * | 6/1959 | Spengler et al. .......... | 428/472.1 |
| 3,173,754 A | * | 3/1965 | Kurtak ......................... | 423/57 |
| 3,764,649 A | | 10/1973 | Kurtak et al. ................. | 423/56 |
| 3,876,755 A | * | 4/1975 | Kurtak et al. ................ | 423/517 |
| 4,242,328 A | * | 12/1980 | Hem et al. ................... | 424/690 |
| 4,604,278 A | | 8/1986 | Reilly et al. ................ | 423/517 |

FOREIGN PATENT DOCUMENTS

| WO | WO95/29126 A1 | 11/1995 | ........... C01G/39/06 |
|---|---|---|---|

OTHER PUBLICATIONS

Mueller et al., "Molybdenum–sulfur clusters", Inorganic Syntheses, vol. 27, pp. 47–51, 1990.*

Chemical Abstract accession No. 114:113911: "Molybdenum–sulfur clusters", Mueller et al., published 1990.*

XP–002318423, Chemical Abstracts Service, A. Mueller et al., accession No. 119 :151081 ,1993, "Molybdenum(IV) Sulfide–Disulfide Complex ('MoIV3S(S2)612–) from Amorphous Molybdenum Trisulfide by the Reaction with Hydroxide and R =0.015 Structure of (NH4)2'MoIV3S(S2)6I.H2O".

XP–002318424, Chemical Abstracts Service, A. Mueller et al., accession No. 116:98146, 1991, "Studies on the Triangular 'Molybdate–Disulfido–Sulfidol Cluster 'Mo3S1312–; Electronic Structure (X.alpha.calculations, XPS), Crystal Structure of (Ph4As)2'Mo3S13!.2CH3CN and a Refinement of the Crystal Structure of (NH4)2'Mo3S13!.H2O".

* cited by examiner

Primary Examiner—Stanley S. Silverman
Assistant Examiner—Ardith E. Hertzog

(57) ABSTRACT

A process for producing an ammonium polythiomolybdate of the formula $(NH_4)_2Mo_3S_{13} \cdot n\, H_2O$ where n is 0, 1 or 2 in which an aqueous ammoniacal molybdate solution is reacted with hydrogen sulfide gas in a closed system at superatmospheric pressure until the $H_2S$ is no longer absorbed by the solution to form a slurry of solid ammonium tetrathiomolybdate containing a portion of the starting molybdenum in a mother liquor containing the balance of the molybdenum and thereafter heat soaking the reaction product in the presence of elemental sulfur to form the desired product.

5 Claims, No Drawings

PROCESS FOR PRODUCING AMMONIUM POLYTHIMOLYBDATE

BACKGROUND OF THE INVENTION

This invention relates to a process for producing an ammonium polythiomolybdate or a hydrate thereof of the formula $(NH_4)_2Mo_3S_{13} \cdot n\ H_2O$. More particularly, it relates to a process for producing ammonium polythiomolybdate which can be carried out economically on a commercial scale.

Ammonium polythiomolybdate has found use as a precursor in the preparation of molybdenum dithiocarbamate additives for lubricants.

U.S. Pat. No. 3,764,649 discloses the preparation of ammonium polythiomolybdate of the formula $3MoS_4 \cdot 2NH_4OH$ by reacting an aqueous ammoniacal solution of ammonium molybdate and ammonium polysulfide at 175–220° C. and 300–700 psig. U.S. Pat. No. 4,604,278 teaches the production of ammonium tetrathiomolybdate by reacting an ammoniacal molybdate solution with hydrogen sulfide gas in a closed system.

Heretofore, the process commercially practiced for making ammonium polythiomolybdate has involved the use of ammonium sulfide which results in the formation of ammonium thiosulfate as an undesired impurity which must be removed.

Therefore, a simpler process for producing ammonium polythiomolybdate economically on a commercial scale and which avoids thiosulfate formation would be highly desirable and an advancement in the art.

SUMMARY OF THE INVENTION

In accordance with the present invention there has been discovered a process for producing an ammonium polythiomolybdate or a hydrate thereof of the formula $(NH_4)_2Mo_3S_{13} \cdot n\ H_2O$ where n is 0, 1 or 2 comprising:

(a) reacting an aqueous ammoniacal molybdate solution with hydrogen sulfide gas in a closed system at superatmospheric pressure, preferably 5–50 psig, for about 1 to 6 hours or until the hydrogen sulfide is no longer absorbed by the solution, to form a slurry of solid ammonium tetrathiomolybdate containing a portion of the starting molybdenum in a mother liquor containing the balance of the molybdenum;

(b) heat soaking the slurry of step (a) in the presence of elemental, preferably at a temperature of about 175–2000° C., in a closed reactor at a pressure of about 600–1000 psig whereby the ammonium tetrathiomolybdate is converted to $(NH_4)_2Mo_3S_{13} \cdot n\ H_2O$;

(c) cooling the slurry of step (b) to ambient temperature;

(d) separating said solid from the major portion of said mother liquor;

(e) washing said solid with water to remove the remaining portion of said mother liquor and soluble impurities from said solid; and (f) drying the resulting washed solid.

DETAILED DESCRIPTION OF THE INVENTION

For a better understanding of the present invention, together with other and further objects, advantages, and capabilities thereof, reference is made to the following disclosure and appended claims in connection with the above description of some of the aspects of the invention.

The starting source of molybdate in the process of this invention is an aqueous ammoniacal molybdate solution comprising ammonium polysulfide, which is a mixture of $(NH_4)_2S$ and elemental sulfur, $S_8$, and in which solution the raw material source of molybdenum may be $MoO_3$, $(NH_4)_2Mo_2O_7$ or $(NH_4)_6Mo_7O_{24}$. Molybdenum concentration may be 5 to 300 grams of Mo per liter.

The aqueous ammoniacal molybdate solution is reacted with hydrogen sulfide gas, at a superatmospheric pressure, preferably a pressure of about 5 to about 50 psig, for about 1 to 6 hours, to form a slurry of solid ammonium tetrathiomolybdate containing a portion of the starting molybdenum in a mother liquor containing the balance of the molybdenum. The length of time of the gassing procedure depends on the size of the reaction vessel, the amount of molybdenum charged, and the actual pressure of the hydrogen sulfide gas.

The reaction is done in a closed system. Therefore only the hydrogen sulfide which is absorbed and reacted is drawn off the source of the gas, and no gas is wasted. A gas regulator on the hydrogen sulfide gas line maintains the pressure inside the sealed reaction tank at the desired pressure. As the hydrogen sulfide is used up by the reaction to form the ammonium tetrathiomolybdate, the pressure inside the tank is effectively decreased. This causes the hydrogen sulfide gas regulator to allow more gas into the tank until the pressure stabilizes at the desired pressure. As the hydrogen sulfide is reacted more is admitted to the reaction tank. Since the reaction to form the ammonium tetrathiomolybdate is exothermic, the temperature will be elevated by about 20° C. to about 30° C. during the reaction. When the temperature begins to drop, it indicates that the reaction has reached completion. The contents of the reaction tank have therefore reached equilibrium and the flow of the hydrogen sulfide gas stops.

Elemental sulfur may then be added to the resulting slurry which is then heat soaked at preferably 175–200° C. and at a pressure 600–1000 psig whereby the oxidation state of the molybdenum is changed and the ammonium tetrathiomolybdate is converted to the desired ammonium polythiomolybdate of the formula $(NH_4)_2Mo_3S_{13} \cdot n\ H_2O$.

The slurry is then cooled to room or ambient temperature, or at least to 60° C.

The solid is then separated from the major portion of the mother liquor by any standard method with the preferred method being filtration. The solid ammonium polythiomolybdate is water washed and the crystals are vacuum dried to a temperature of no greater than 35° C. The mother liquor and wash water are recycled back into the process.

The process of this invention offers several advantages: multiple processing steps are eliminated, lower amounts of by-products are formed, more mother liquor is recycled to the process, thereby reducing disposal costs, the amount of water wash solution is reduced, and there is a higher product yield of ammonium polythiomolybdate.

EXAMPLE

This novel process requires the reaction to be conducted in a high pressure vessel. The raw materials can all be charged into a single reactor or the MOX (molybdic oxide) powder can be premixed in a separate vessel along with the ML (mother liquor) and then charged into the main reactor (pre-charging the MOX with ML and mixing for 30–60 minutes saves cycle-time). After the charges are complete, the reactor is closed up, purged with inert gas $(N_2)$ and hydrogen sulfide gas is fed to the reactor. A pressure between 25 psig and 50 psig is maintained while applying cooling water to the reactor jacket and/or coils. Once the exotherm is complete, H₂S feed is stopped and the contents are heated. The pressure in the reactor increases with the vapor pressure of the contents as the temperature goes up. The reaction mass is heat soaked and then cooled. Once the batch is completed and cooled down, the solids are recovered by filtration and then dried. The resulting product can then be directly dropped/packaged into super-sacks after confirming the material is dry. See table below for sequence and cycle-times.

Charges to the Reactor:

The following charges using ML recycling yield about one metric ton ATM (ammonium polythiomolybdate product) per batch.

| | |
|---|---|
| Molybdic oxide | 1,250 lbs |
| Ammonium Polysulfide solution (20% sulfide content as H₂S and 22% NH₃ content) (APS) | 3,000 lbs |
| Sulfur (industrial grade dry sulfur) | 600 lbs |
| Mother Liquor recycle; Mother Liquor has 4.5–5.5 wt. % ammonia and 8–9 wt. % H₂S in the aqueous solution | 9,375 lbs |
| H₂S | ~800 lbs |
| Yield (Dried ATM) | 2,200 lbs |
| Drying losses | ~300 lbs |
| ML purged | 3,180 lbs |

The first batch will obviously have no starting Mother Liquor. Ammonium polysulfide should be charged in its place. On subsequent batches, most of the filtrate or ML is used to dissolve the necessary amount of molybdic oxide reactant. This solution is combined with the fresh ammonium polysulfide to make-up the new reaction solution.

The following is a conservative estimate of the cycle times for individual steps of the ATM process:

| Process Step | Cycle Time, hrs. |
|---|---|
| a. Charge MOX/ML pre-mixed solution to reactor vessel | 0.5 |
| b. Charge APS to reactor | 1.0 |
| c. Purge reactor with inert gas (to scrubber) | 0.5 |
| d. Add H2S to the reactor. Maintain a pressure of 25–50 psig | 4.0 |
| e. Heat-up to reaction temperature of 180° C. to 200° C. | 3.0 |

-continued

| Process Step | Cycle Time, hrs. |
|---|---|
| f. React at 180° C. to 200° C. | 3.0 |
| g. Cool to filtration temperature of <50° C. | 4.0 |
| h. Transfer to filter | 1.0 |
| TOTAL CYCLE TIME IN REACTOR | 17.0 |
| i. Filtration | 4.0 |
| j. Drying/packaging | 3.0 |

What is claimed is:

1. A process for producing an ammonium polythiomolybdate of the formula $(NH_4)_2Mo_3S_{13} \cdot n\ H_2O$ where n is 0, 1 or 2 comprising:

(a) reacting an aqueous ammoniacal molybdate solution with hydrogen sulfide gas in a closed system at superatmospheric pressure until the H₂S is no longer absorbed by the solution, to form a slurry of solid ammonium tetrathiomolybdate containing a portion of the starting molybdenum in a mother liquor containing the balance of the molybdenum;

(b) heat soaking the slurry of step (a) in a closed reactor in the presence of elemental sulfur at a pressure of 600–1000 psig whereby the ammonium tetrathiomolybdate is converted to $(NH_4)_2Mo_3S_{13} \cdot n\ H_2O$;

(c) cooling the slurry of step (b) to ambient temperature;

(d) separating said solid from the major portion of said mother liquor;

(e) washing said solid with water to remove the remaining portion of said mother liquor and soluble impurities from said solid; and (f) drying the resulting washed solid.

2. The process of claim 1 wherein the ammonium polythiomolybdate is $(NH_4)_2Mo_3S_{13}$.

3. The process of claim 1 wherein the aqueous ammoniacal molybdate solution comprises $MoO_3$, $(NH_4)_2S$ and elemental sulfur.

4. The process of claim 1 wherein the superatmospheric pressure in step (a) is 5–50 psig.

5. The process of claim 1 wherein the heat soaking in step (b) is conducted at a temperature of 175–200° C.

* * * * *